United States Patent
Trautman et al.

(10) Patent No.: US 9,031,375 B2
(45) Date of Patent: May 12, 2015

(54) VIDEO FRAME STILL IMAGE SEQUENCES

(71) Applicant: FlixMaster, Inc., Boulder, CO (US)

(72) Inventors: Justin Tucker Trautman, Morrison, CO (US); Jonathan R. A. Woodard, Boulder, CO (US)

(73) Assignee: Rapt Media, Inc., Boulder, CO (US)

( * ) Notice: Subject to any disclaimer, the term of this patent is extended or adjusted under 35 U.S.C. 154(b) by 0 days.

(21) Appl. No.: 13/935,014

(22) Filed: Jul. 3, 2013

(65) Prior Publication Data

US 2014/0314394 A1 Oct. 23, 2014

Related U.S. Application Data

(60) Provisional application No. 61/813,531, filed on Apr. 18, 2013.

(51) Int. Cl.
*H04N 5/77* (2006.01)
*G11B 27/00* (2006.01)
*G06F 9/54* (2006.01)

(52) U.S. Cl.
CPC .............. *G11B 27/005* (2013.01); *G06F 9/542* (2013.01)

(58) Field of Classification Search
USPC .......... 386/225, 285, 286, 287, 248, 201, 203
See application file for complete search history.

(56) References Cited

U.S. PATENT DOCUMENTS

| | | | |
|---|---|---|---|
| 5,329,320 A * | 7/1994 | Yifrach | 348/738 |
| 5,524,637 A | 6/1996 | Erickson | |
| 5,576,551 A | 11/1996 | Adair | |
| 5,675,752 A | 10/1997 | Scott et al. | |
| 5,676,551 A | 10/1997 | Knight et al. | |
| 5,895,123 A * | 4/1999 | Fujii et al. | 386/201 |
| 6,222,925 B1 | 4/2001 | Shiels et al. | |
| 6,223,211 B1 * | 4/2001 | Hamilton et al. | 709/203 |
| 6,357,047 B1 * | 3/2002 | Kurtze et al. | 725/151 |
| 6,687,454 B1 * | 2/2004 | Kuroiwa | 386/241 |
| 6,975,832 B2 * | 12/2005 | Adams et al. | 434/317 |
| 6,977,673 B1 * | 12/2005 | McKain et al. | 348/207.99 |

(Continued)

FOREIGN PATENT DOCUMENTS

| | | |
|---|---|---|
| DE | 10053720 | 4/2002 |
| EP | 1033157 | 9/2000 |

(Continued)

OTHER PUBLICATIONS

"CD-i or Compact Disc Interactive", Wikipedia, retrieved on Aug. 9, 2011 from URL: http://en.wikipedia.org/wiki/CD-i, 6 pages.

(Continued)

*Primary Examiner* — Helen Shibru
(74) *Attorney, Agent, or Firm* — Dorsey & Whitney LLP

(57) ABSTRACT

An electronic device may determine to present a video frame still image sequence version of a video instead of the video. The electronic device may derive a plurality of still images from the video. The electronic device may generate the video frame still image sequence by associating the plurality of still images. The electronic device may present the video frame still image sequence. The video frame still image sequence may be displayed according to timing information to resemble play of the video. In some cases, audio may also be derived from the video. In such cases, display of the video frame still image sequence may be performed along with play of the audio.

24 Claims, 7 Drawing Sheets

(56) References Cited

U.S. PATENT DOCUMENTS

| | | | |
|---|---|---|---|
| 7,373,377 B2 | 5/2008 | Altieri | |
| 7,623,754 B1 * | 11/2009 | McKain et al. | 386/278 |
| 7,702,014 B1 | 4/2010 | Kellock et al. | |
| 7,788,583 B1 | 8/2010 | Amzallag et al. | |
| 8,156,520 B2 * | 4/2012 | Casagrande et al. | 725/32 |
| 8,380,049 B2 * | 2/2013 | Lang et al. | 386/291 |
| 8,600,220 B2 | 12/2013 | Bloch et al. | |
| 8,732,180 B2 | 5/2014 | Lindahl et al. | |
| 2002/0082063 A1 | 6/2002 | Miyaki et al. | |
| 2002/0091455 A1 | 7/2002 | Williams | |
| 2002/0120456 A1 | 8/2002 | Berg et al. | |
| 2003/0169295 A1 | 9/2003 | Becerra, Jr. | |
| 2004/0009813 A1 | 1/2004 | Wind | |
| 2004/0193441 A1 | 9/2004 | Altieri | |
| 2005/0071736 A1 | 3/2005 | Schneider et al. | |
| 2005/0102707 A1 | 5/2005 | Schnitman | |
| 2005/0120389 A1 | 6/2005 | Boss et al. | |
| 2005/0217462 A1 * | 10/2005 | Thomson et al. | 84/612 |
| 2006/0268007 A1 * | 11/2006 | Gopalakrishnan | 345/619 |
| 2007/0020604 A1 | 1/2007 | Chulet et al. | |
| 2007/0112837 A1 | 5/2007 | Houh et al. | |
| 2007/0118801 A1 | 5/2007 | Harshbarger et al. | |
| 2007/0162395 A1 | 7/2007 | Ben-Yaacov et al. | |
| 2007/0239754 A1 | 10/2007 | Schnitman | |
| 2008/0163089 A1 | 7/2008 | Altieri | |
| 2008/0300967 A1 | 12/2008 | Buckley et al. | |
| 2008/0320531 A1 | 12/2008 | Kim et al. | |
| 2009/0022159 A1 | 1/2009 | Coleman et al. | |
| 2009/0172022 A1 | 7/2009 | Bathiche et al. | |
| 2009/0228572 A1 | 9/2009 | Wall et al. | |
| 2010/0031149 A1 | 2/2010 | Gentile et al. | |
| 2010/0088735 A1 | 4/2010 | Sadja et al. | |
| 2010/0186579 A1 | 7/2010 | Schnitman | |
| 2010/0242110 A1 | 9/2010 | Louch et al. | |
| 2010/0293455 A1 | 11/2010 | Bloch | |
| 2010/0332404 A1 | 12/2010 | Valin | |
| 2011/0028213 A1 | 2/2011 | Dusenberry et al. | |
| 2011/0126106 A1 | 5/2011 | Shaul et al. | |
| 2011/0200116 A1 | 8/2011 | Bloch et al. | |
| 2011/0202562 A1 | 8/2011 | Bloch et al. | |
| 2013/0104024 A1 | 4/2013 | Rajkumar et al. | |
| 2013/0259442 A1 | 10/2013 | Bloch et al. | |
| 2014/0019863 A1 | 1/2014 | Callanan | |
| 2014/0026175 A1 | 1/2014 | Callanan | |
| 2014/0033038 A1 | 1/2014 | Callanan | |
| 2014/0078397 A1 | 3/2014 | Bloch et al. | |
| 2014/0082666 A1 | 3/2014 | Bloch et al. | |
| 2014/0178051 A1 | 6/2014 | Bloch et al. | |
| 2014/0376883 A1 | 12/2014 | Callanan | |

FOREIGN PATENT DOCUMENTS

| | | |
|---|---|---|
| EP | 2712206 A1 | 3/2014 |
| GB | 2428329 | 1/2007 |
| WO | 2008/052009 | 5/2008 |
| WO | 2010/131244 | 11/2010 |
| WO | 2010131244 A1 | 11/2010 |
| WO | 2012/114329 | 8/2012 |
| WO | 2012/114330 | 8/2012 |
| WO | 2012114330 A1 | 8/2012 |
| WO | 2013/150378 | 10/2013 |

OTHER PUBLICATIONS

"Dragon's Lair", Wikipedia, retrieved on Aug. 9, 2011 from URL: http://en.wikipedia.org/wiki/Dragon%27s_Lair, 11 pages.

"Laserdisc video game", Wikipedia, retrieved on Aug. 9, 2011 from URL: http://en.wikipedia.org/wiki/Laserdisc_video_game, 2 pages.

"You Tube Help—Creating or editing annotations", YouTube, retrieved on Aug. 9, 2011 from URL: http://www.google.com/support/youtube/bin/answer.py?answer=92710&topic=14354, 5 pages.

EP Supplemental Search Report dated Jun. 28, 2012, EP Application No. 2430631, 2 Pages.

PCT International Search Report and Written Opinion dated Mar. 8, 2012, PCT Application No. PCT/US2011/056453, filed Oct. 14, 2011, 12 pages.

PCT International Search Report dated Aug. 25, 2010, PCT Application No. PCT/IL2010/000362, 2 pages.

US Non-Final Office Action dated Jul. 23, 2012, U.S. Appl. No. 13/034,645, 13 pages.

"Official word from Google", retrieved on Apr. 7, 2014 from URL: https://supportgoogle.com/webmasters/answer/34445?hl=en, 1 page.

"An iFrame test", retrieved on Apr. 7, 2014 from URL: http://www.rimmkaufman.com/blog/do-search-engines-follow-links-in-iframes/31012012/, 11 pages.

"http://www.readwritethink.org/classroom-resources/student-interactives/plot-diagram-30040.html", earliest date Feb. 21, 2010.

Final Office Action dated Apr. 10, 2014, for U.S. Appl. No. 13/274,224.

Non-Final Office Action dated Sep. 13, 2013, for U.S. Appl. No. 13/274,224.

Non-Final Office Action dated Sep. 10, 2014, for U.S. Appl. No. 13/934,800.

Non-Final Office Action dated Aug. 29, 2014, for U.S. Appl. No. 13/934,446.

* cited by examiner

VIDEO FRAME STILL IMAGE SEQUENCES

CROSS-REFERENCE TO RELATED APPLICATION

The present application claims the benefit under 35 U.S.C. §119(e) to U.S. Provisional Patent Application No. 61/813,531, which was filed on Apr. 18, 2013, entitled "SYSTEM AND METHOD FOR CREATING AND ANALYZING INTERACTIVE EXPERIENCES," which is incorporated by reference as if fully disclosed herein.

TECHNICAL FIELD

This disclosure relates generally to video, and more specifically to conversion of video to video frame still image sequences.

BACKGROUND

Many electronic device that are capable of playing video, particularly mobile devices such as smart phones, may have limitations imposed on their play/playback of video. For example, some electronic devices may force full screen playback, disallowing other interactive elements to be on the screen with the video. By way of another example, some electronic devices may require user interaction to begin playback. By way of yet a third example, some electronic devices may not possess sufficient hardware and/or software resources (such as screen size, processing power, memory, and so on) for play of video. By way of a fourth example, some video may be in a format that may not be compatible with some electronic devices.

Such imposed limitations may unnecessarily limit the functionality of video on electronic devices. For example, such limitations may prevent the creation and/or utilization of interactive media. Such limitations may also prevent play of various videos on various electronic devices. In some cases, concern regarding such limitations may not have existed for certain types of media delivery devices such as televisions or desktop computers as those devices may have had fewer limitations imposed on their play/playback of video, such as fewer restrictive screen or bandwidth limitations.

SUMMARY

The present disclosure discloses systems, methods, and computer program products for converting video to video frame still image sequences. An electronic device may determine to present a video frame still image sequence version of a video instead of the video. The electronic device may derive a plurality of still images from the video. The electronic device may generate the video frame still image sequence by associating the plurality of still images. The electronic device may present the video frame still image sequence.

The video frame still image sequence may be displayed according to timing information to resemble play of the video. Such timing information may be based at least in part on a duration of the video and may be stored in the video frame still image sequence, stored in one or more files related to the video frame still image sequence, determined by the electronic device presenting the video frame still image sequence, and so on.

When the video frame still image sequence is displayed, a determination may be made as to whether or not the video frame still image sequence is in synch with the timing information. If an image of the video frame still image sequence being presented is chronologically ahead of the timing information, the display may be delayed to resynchronize the video frame still image sequence with the timing information. On the other hand, if an image of the video frame still image sequence being presented is chronologically behind the timing information, the display jump to a subsequent image of the video frame still image sequence to resynchronize the video frame still image sequence with the timing information.

In some cases, audio may also be derived from the video. In such cases, display of the video frame still image sequence may be performed along with play of the audio. Further, in such cases the timing information may be based at least one the audio and may be contained within the audio. Additionally, in such cases the display of the video frame still image sequence may be kept in synch with the play of the audio as described above.

In various implementations, an electronic device may determine to present a video frame still image sequence version of a video instead of the video upon receiving a request to play the video. In such implementations the electronic device may generate the video frame still image sequence (and may store the generated video frame still image sequence) and presenting the video frame still image sequence may include displaying the video frame still image sequence. Alternatively in such implementations, the electronic device may request and receive the video frame still image sequence from another electronic device that generates video frame still image sequence. The electronic device may determine to present a video frame still image sequence version of a video instead of the video in response to determining that the electronic device cannot play the video (such as the electronic device does not have a video codec compatible with the video), does not have sufficient resources to play the video (such as insufficient video memory), cannot play the video on only a portion of a display of the electronic device (such as the electronic device must present the video full screen instead of within a video player application embedded within another application such as a web browser), and so on.

In other implementations, an electronic device may determine to present a video frame still image sequence version of a video instead of the video by determining that another electronic device may request the video frame still image sequence version of the video instead of the video. In such implementations, the generation operation may be performed in anticipation of a request for the video frame still image sequence, in response to a request for the video frame still image sequence and/or a portion thereof, and so on. Further, in such implementations the operation of presentation may include transmitting the video frame still image sequence and/or a portion thereof to the other electronic device.

In one or more implementations, the operation of deriving the still images from the video may include determining a number of images that can be displayed to resemble play of the video and deriving that number of images. The determination of the number may be based at least one a frame rate of the video, a duration of the video and/or audio associated with the video, default frame rates, and so on.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

Figure 1:
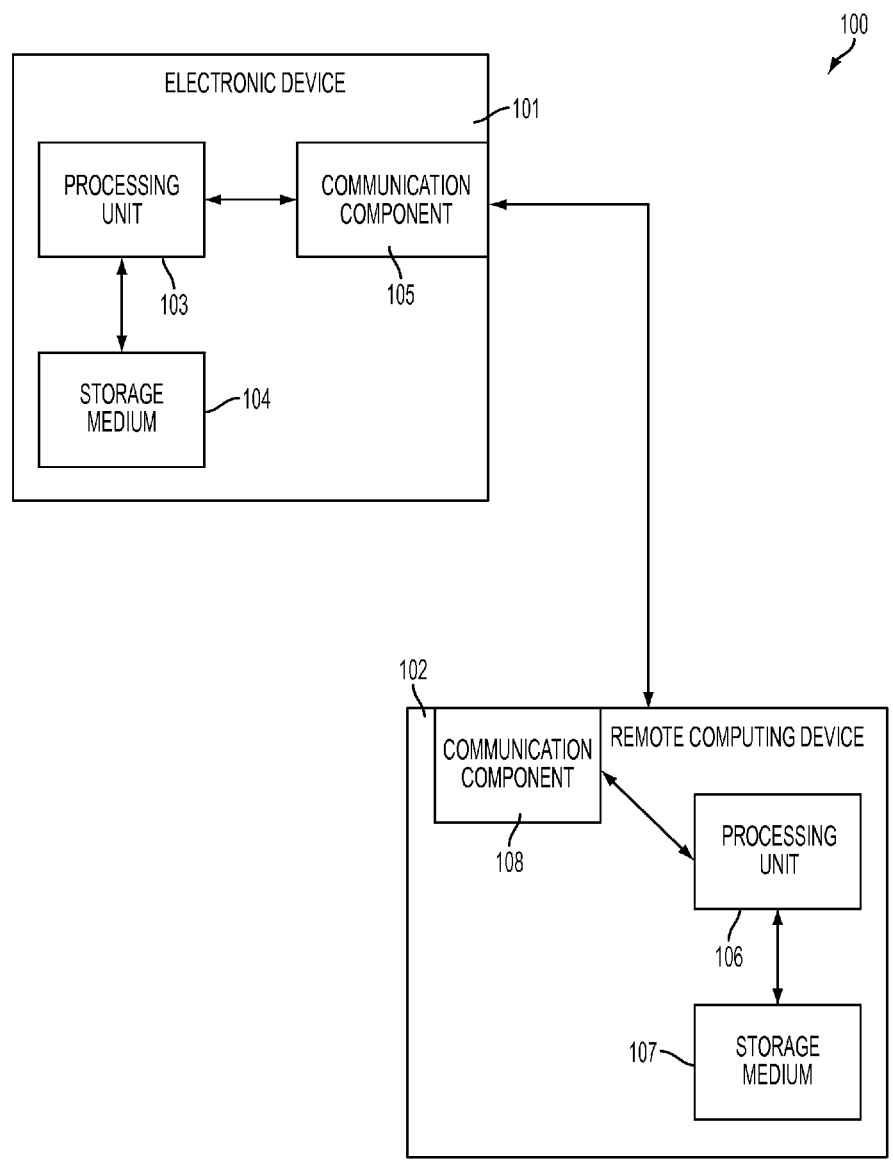
FIG. 1 is a block diagram illustrating a system for converting video to video frame still image sequences.

The description that follows includes sample systems, methods, and computer program products that embody various elements of the present disclosure. However, it should be understood that the described disclosure may be practiced in a variety of forms in addition to those described herein.

The present disclosure discloses systems, methods, and computer program products for converting video to video frame still image sequences. An electronic device may determine to present a video frame still image sequence version of a video instead of the video. The electronic device may derive a plurality of still images from the video. The electronic device may generate the video frame still image sequence by associating the plurality of still images. The electronic device may present the video frame still image sequence.

The video frame still image sequence may be displayed according to timing information to resemble play of the video. Such timing information may be based at least in part on a duration of the video and may be stored in the video frame still image sequence, stored in one or more files related to the video frame still image sequence, determined by the electronic device presenting the video frame still image sequence, and so on.

When the video frame still image sequence is displayed, a determination may be made as to whether or not the video frame still image sequence is in synch with the timing information. If an image of the video frame still image sequence being presented is chronologically ahead of the timing information, the display may be delayed to resynchronize the video frame still image sequence with the timing information. On the other hand, if an image of the video frame still image sequence being presented is chronologically behind the timing information, the display jump to a subsequent image of the video frame still image sequence to resynchronize the video frame still image sequence with the timing information.

In some cases, audio may also be derived from the video. In such cases, display of the video frame still image sequence may be performed along with play of the audio. Further, in such cases the timing information may be based at least one the audio and may be contained within the audio. Additionally, in such cases the display of the video frame still image sequence may be kept in synch with the play of the audio as described above.

In various implementations, an electronic device may determine to present a video frame still image sequence version of a video instead of the video upon receiving a request to play the video. In such implementations the electronic device may generate the video frame still image sequence (and may store the generated video frame still image sequence) and presenting the video frame still image sequence may include displaying the video frame still image sequence. Alternatively in such implementations, the electronic device may request and receive the video frame still image sequence from another electronic device that generates video frame still image sequence. The electronic device may determine to present a video frame still image sequence version of a video instead of the video in response to determining that the electronic device cannot play the video (such as the electronic device does not have a video codec compatible with the video), does not have sufficient resources to play the video (such as insufficient video memory), cannot play the video on only a portion of a display of the electronic device (such as the electronic device must present the video full screen instead of within a video player application embedded within another application such as a web browser), and so on.

In other implementations, an electronic device may determine to present a video frame still image sequence version of a video instead of the video by determining that another electronic device may request the video frame still image sequence version of the video instead of the video. In such implementations, the generation operation may be performed in anticipation of a request for the video frame still image sequence, in response to a request for the video frame still image sequence and/or a portion thereof, and so on. Further, in such implementations the operation of presentation may include transmitting the video frame still image sequence and/or a portion thereof to the other electronic device.

In one or more implementations, the operation of deriving the still images from the video may include determining a number of images that can be displayed to resemble play of the video and deriving that number of images. The determination of the number may be based at least one a frame rate of the video, a duration of the video and/or audio associated with the video, default frame rates, and so on.

FIG. 1 is a block diagram illustrating a system 100 for converting video to video frame still image sequences. The system 100 includes an electronic device 101 which may be any kind of electronic device such as a desktop computer, a laptop computer, a smart phone, a cellular telephone, a personal digital assistant, a mobile computer, a tablet computer, a digital video player, and/or other such electronic device.

The electronic device 101 may include one or more processing units 103, one or more one or more non-transitory storage media 104 (which may take the form of, but is not limited to, a magnetic storage medium; optical storage medium; magneto-optical storage medium; read only memory; random access memory; erasable programmable memory; flash memory; and so on), one or more communication components 105, and/or other components (such as one or more displays and/or audio presentation components, which are not shown, for playing audio and/or video and/or displaying one or more video frame still image sequences. The processing unit 103 may execute instructions stored in the non-transitory storage medium 104 to perform various electronic device functions such as playing video; displaying video frame still image sequences; playing audio and displaying video frame still image sequences; executing applications such as web browser applications, video player applications, executing video player applications embedded in other applications such as web browser applications; converting video to video frame still image sequences; communicating with the remote computing device (such as to request and/or receive one or more videos, video frame still image sequences, audio related to video frame still image sequences, timing information related to video frame still image sequences, and so on), and/or other such functions.

The system 100 may also include a remote computing device 102 which may be any kind of computing device such as a desktop computer, a laptop computer, a smart phone, a cellular telephone, a personal digital assistant, a mobile computer, a tablet computer, a digital video player, and/or other such electronic device. The remote computing device 102 may be remote from the electronic device 101 in that they are not the same device and communicate via one or more communication media (such as via the communication components 105 and 108).

The remote computing device 102 may include one or more processing units 106, one or more one or more non-transitory storage media 107 (which may take the form of, but is not limited to, a magnetic storage medium; optical storage medium; magneto-optical storage medium; read only memory; random access memory; erasable programmable memory; flash memory; and so on), one or more communication components 108, and/or other components. The processing unit 106 may execute instructions stored in the non-transitory storage medium 107 to perform various remote computing device functions such as converting video to video frame still image sequences; storing and/or serving one or more videos, audio, video frame still image sequences, and so on; communicating with the electronic device (such as to transmit and/or receive requests for one or more videos, video frame still image sequences, audio related to video frame still image sequences, timing information related to video frame still image sequences, and so on); and/or other such functions.

The electronic device 101 and/or the remote computing device 102 may determine to present a video frame still image sequence version of a video instead of the video. As such, the electronic device and/or the remote computing device may derive a plurality of still images from the video. The electronic device and/or the remote computing device may generate the video frame still image sequence by associating the plurality of still images. The electronic device and/or the remote computing device may then present the video frame still image sequence.

The video frame still image sequence may be displayed according to timing information to resemble play of the video. Such timing information may be based at least in part on a duration of the video and may be stored in the video frame still image sequence, stored in one or more files related to the video frame still image sequence, determined by the electronic device 101 when presenting the video frame still image sequence, and so on.

When the video frame still image sequence is displayed, the electronic device 101 may determine whether or not the video frame still image sequence is in synch with the timing information. If an image of the video frame still image sequence being presented is chronologically ahead of the timing information, the electronic device may delay display of the image to resynchronize the video frame still image sequence with the timing information. On the other hand, if an image of the video frame still image sequence being presented is chronologically behind the timing information, the electronic device may jump to a subsequent image of the video frame still image sequence to resynchronize.

In some cases, the electronic device 101 and/or the remote computing device 102 may also derive audio from the video. In such cases, the electronic device 101 may display the video frame still image sequence along with play of the audio. Further, in such cases the timing information may be based at least one the audio and may be contained within the audio. Additionally, in such cases the electronic device may keep display of the video frame still image sequence in synch with the play of the audio.

For example, when the video frame still image sequence is displayed, the electronic device 101 may determine whether or not the video frame still image sequence is in synch with the audio. If an image of the video frame still image sequence being presented is chronologically ahead of the audio, the electronic device may delay display of the image to resynchronize the video frame still image sequence with the audio. On the other hand, if an image of the video frame still image sequence being presented is chronologically behind the audio, the electronic device may jump to a subsequent image of the video frame still image sequence to resynchronize.

In various implementations, the electronic device 101 may determine to present a video frame still image sequence version of a video instead of the video upon receiving a request to play the video (such as from a user or from one or more executing applications). In such implementations the electronic device may generate the video frame still image sequence (and may store the generated video frame still image sequence) and presenting the video frame still image sequence may include displaying the video frame still image sequence.

Alternatively in such implementations, the electronic device 101 may request and receive the video frame still image sequence from the remote computing device 102, which generates video frame still image sequence (whether in response to or in anticipation of the request).

The electronic device 101 may determine to present a video frame still image sequence version of a video instead of the video in response to determining that the electronic device 101 cannot play the video (such as the electronic device does not have a video codec compatible with the video), does not have sufficient resources to play the video (such as insufficient video memory), cannot play the video on only a portion of a display of the electronic device (such as the electronic device must present the video full screen instead of within a video player application embedded within another application such as a web browser), and so on.

In other implementations, the remote computing device 102 may determine to present a video frame still image sequence version of a video instead of the video by determining that the electronic device 101 may request the video frame still image sequence version of the video instead of the video. In such implementations, the generation may be performed in anticipation of a request for the video frame still image sequence, in response to a request for the video frame still image sequence and/or a portion thereof, and so on. Further, in such implementations, presentation may include transmitting the video frame still image sequence and/or a portion thereof to the electronic device.

In one or more implementations, deriving of the still images from the video by the electronic device 101 and/or the remote computing device 102 may include determining a number of images that can be displayed to resemble play of the video and deriving that number of images. The determination of the number may be based at least one a frame rate of the video, a duration of the video and/or audio associated with the video, default frame rates, and so on.

Figure 2:
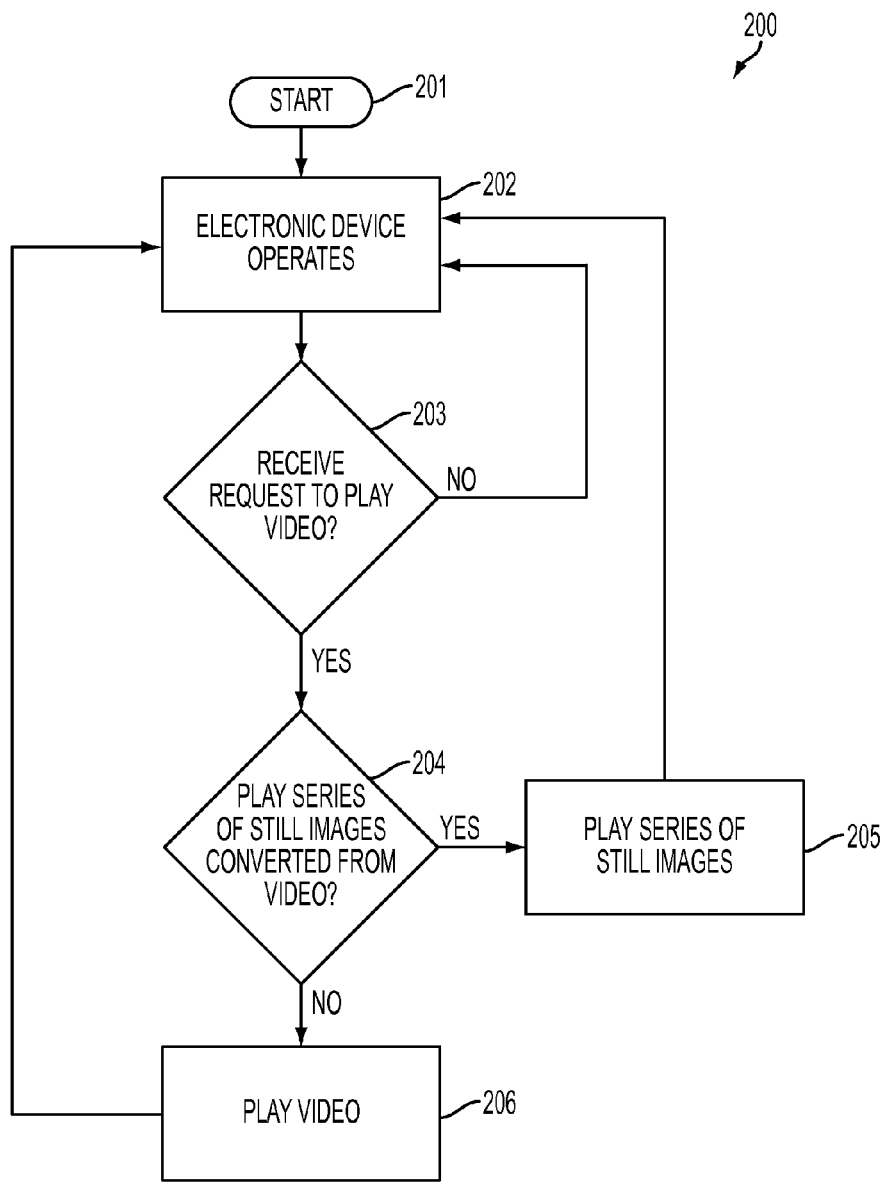
FIG. 2 is a flow chart illustrating a method for playing video and/or displaying still image sequence versions of the video. This method may be performed by an electronic device such as the electronic device or the remote computing device of FIG. 1.

FIG. 2 illustrates a method 200 for playing video and/or displaying still image sequence versions of the video. The method 200 may be performed by an electronic device such as the electronic device 101 or the remote computing device 102 of FIG. 1.

The flow begins at block 201 and proceeds to block 202 where the electronic device operates. The flow then proceeds to block 203 where the electronic device determines whether or not a request to play video has been received. If so, the flow proceeds to block 204. Otherwise, the flow returns to block 202 where the electronic device continues to operate.

At block 204, the electronic device determines whether or not to display a series of still images converted from the video instead of the video. If so, the flow proceeds to block 205. Otherwise, the flow proceeds to block 206.

At block 205, after the electronic device determines to display the series of still images converted from the video instead of the video, the electronic device displays the series of still images. Such display may be performed along with play of audio derived from the video. Such display may also be performed in accordance with timing information in order to resemble or mimic play of the video. The flow then returns to block 202 where the electronic device continues to operate.

At block 206, after the electronic device determines not to display the series of still images converted from the video instead of the video, the electronic device plays the video. The flow then returns to block 202 where the electronic device continues to operate.

Figure 3:
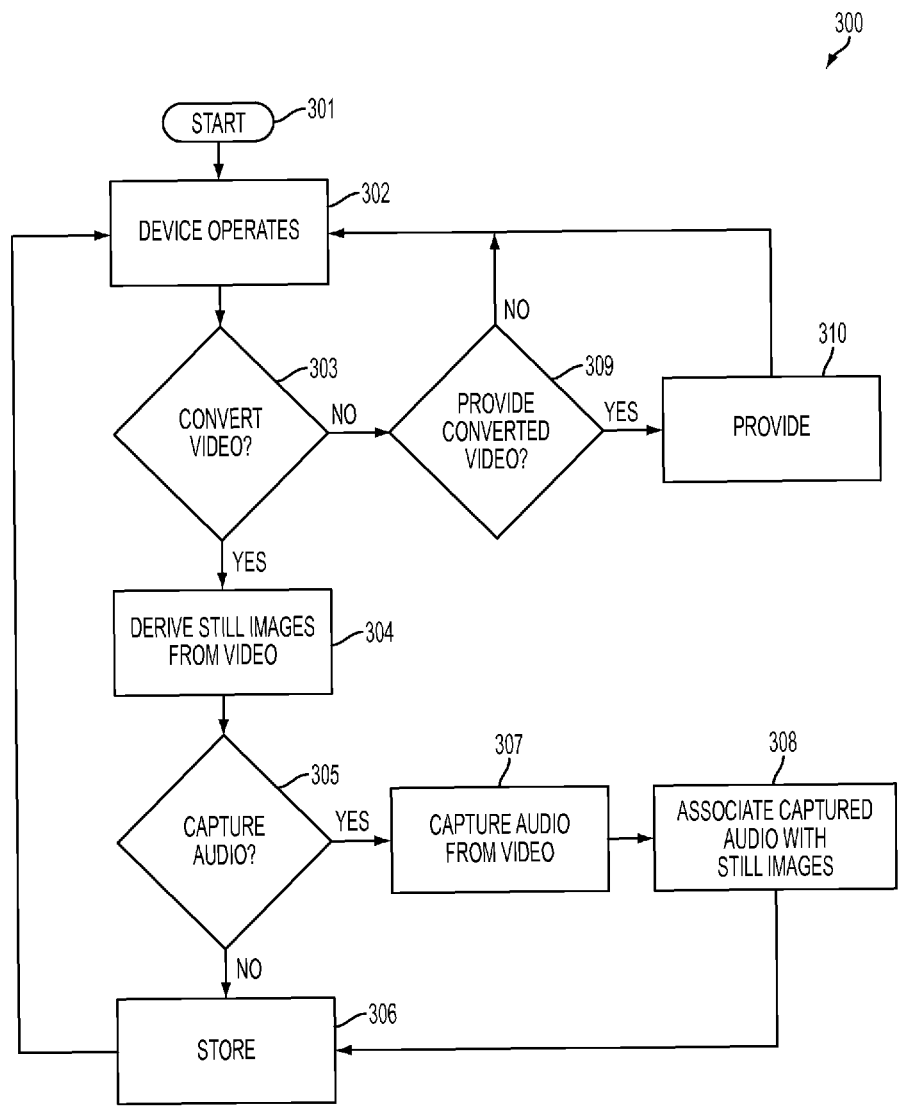
FIG. 3 is a flow chart illustrating a method for converting video to video frame still image sequences. This method may be performed by an electronic device such as the electronic device or the remote computing device of FIG. 1.

FIG. 3 illustrates a method 300 for converting video to video frame still image sequences. The method 300 may be performed by an electronic device such as the electronic device 101 or the remote computing device 102 of FIG. 1.

The flow begins at block 301 and proceeds to block 302 where the electronic device operates. The flow then proceeds to block 303 where the electronic device determines whether or not to convert video to a still image sequence version of the video. If so, the flow proceeds to block 304. Otherwise, the flow proceeds to block 309.

At block 304, after the electronic device determines to convert video to a still image sequence version of the video, the electronic device derives still images from the video. The flow then proceeds to block 305 where the electronic device determines whether or not to capture audio from the video to associate with the still image sequence. If so, the flow proceeds to block 307. Otherwise, the flow proceeds to block 306.

At block 306, after the electronic device determines not to capture audio from the video to associate with the still image sequence, the electronic device associates the derived still images together as the still image sequence and stores the still image sequence. Such storage may include loading the still image sequence and/or a portion thereof in a memory as part of displaying the still image sequence. The flow then returns to block 302 where the electronic device continues to operate.

At block 307, after the electronic device determines to capture audio from the video to associate with the still image sequence, the electronic device captures audio from the video. The flow then proceeds to block 308 where the electronic device associates the captured audio with the derived still images. The flow then proceeds to block 306 where the electronic device associates the derived still images and the audio together as the still image sequence and stores the still image sequence. Such storage may include loading the still image sequence and/or a portion thereof in a memory as part of displaying the still image sequence and/or playing the audio.

In various implementations, a video player, embedded within the display of another application, may load a collection of still images and utilize some timing mechanism such as an audio file or a simple timer. As the timing mechanism proceeds, it may trigger the video player to transition from one image to another, in sequence, giving the impression of more traditional video playback.

Figure 4:
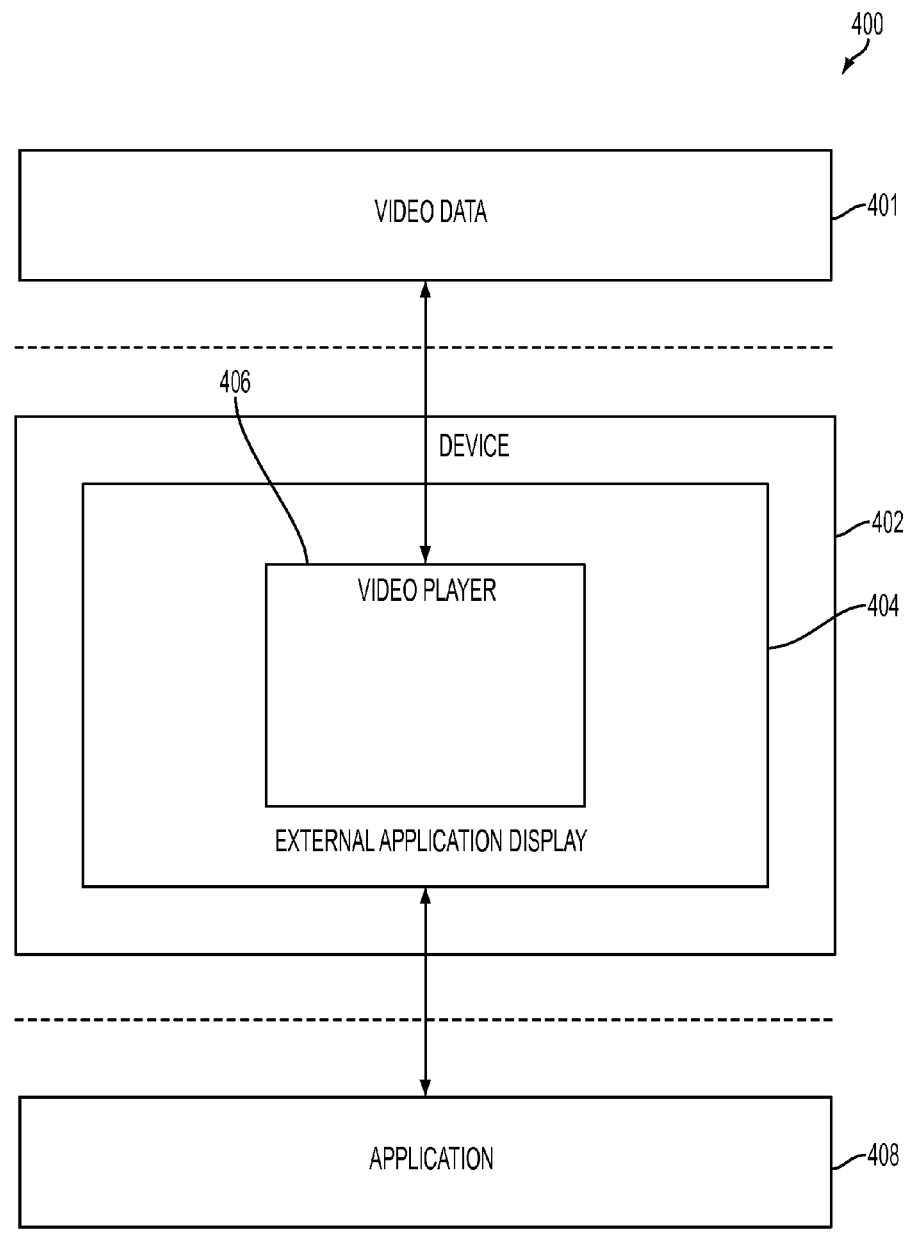
FIG. 4 is a functional block diagram of one example of video play embedded within another application.

FIG. 4 illustrates 400 the manner in which a video player may be embedded within another application and still allow the user to interact with the external application without impacting the video in any way.

When a device (402) loads an application that can embed videos (408), it may render a video player (406) within the display area for the application (404). The display area for the application (404) may continue to interact with the application (408), completely independent of the video player, which could pull its data from some other data store (401), independent of the application.

The user may interact with the player before, during, or after playback of a video, as with a normal video player, with or without having any impact on the external application's display (404), or the application itself (408). The user may also interact with the external application's display (404) with or without having any impact on the video player (406).

Figure 5:
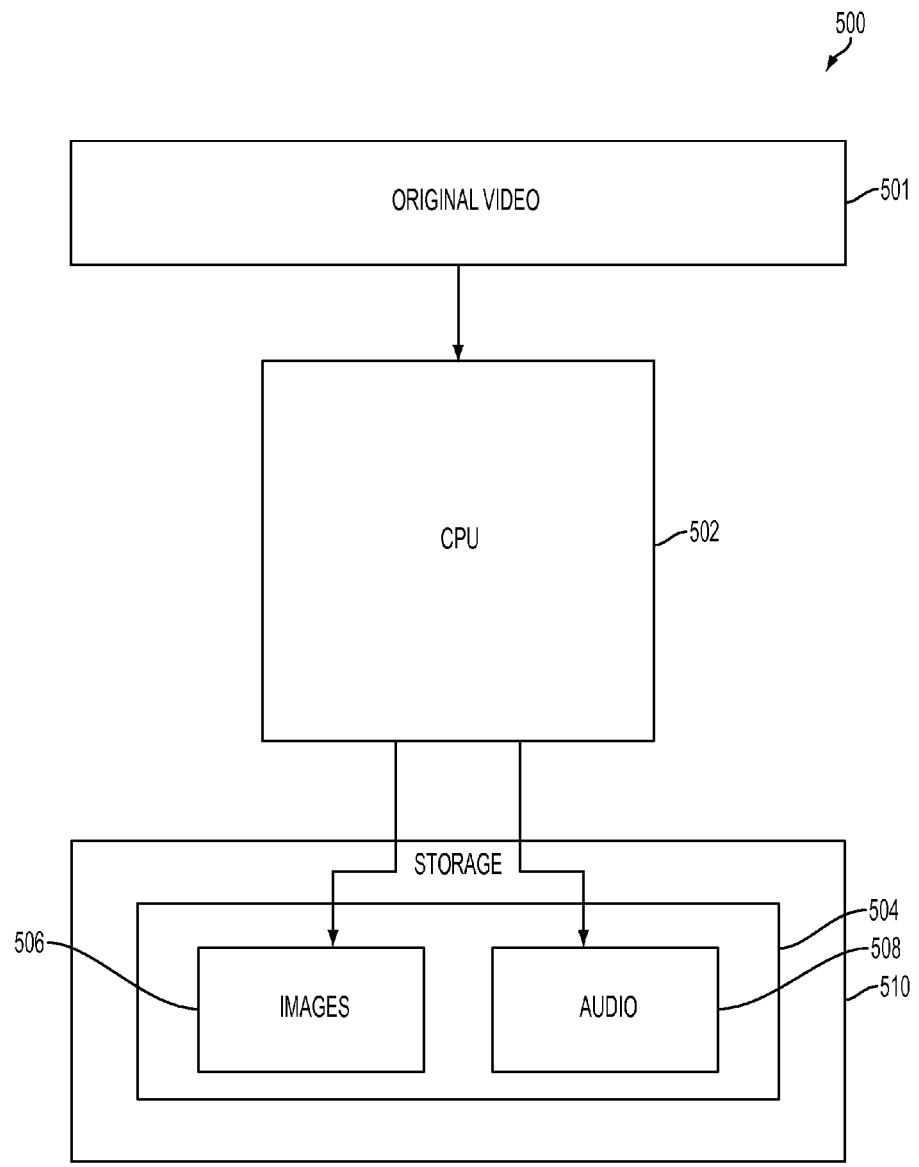
FIG. 5 is a functional block diagram of one example of a process to take a video file formatted for traditional video players, and translate it into a package of files for use within a video player for limited video capability contexts.

FIG. 5 details an example process 500 to take a video file formatted for traditional video players, and translate it into a package of files for use within a video player for limited video capability contexts.

When a traditional video format file (501) is provided, the CPU (502) may process this file and translate it into component files (504) for storage and later delivery. The component files may include a collection of video frame still images from the video (506) at regular intervals, as well as an audio file (508) containing audio to accompany the generated images, of the same or similar time length as the original video. The video frame still images may be post processed to create video frame still image sequences that exist in a single image file to reduce the number of storage requests needed to deliver the content.

These component files (504) may then be stored on a storage mechanism (510) for later playback within a limited video capability context.

Herein, unless otherwise defined, "traditional video" is intended to include all digital files (such as mpeg, h.264, ogg, webm, avi, etc.) and analog storage formats (magnetic tape, film negative, etc.) for videos, intended to be used directly through a mechanical or digital playback device.

Herein, unless otherwise defined, "storage mechanism" is intended to include any form of storing digital data for later use, such as hard drives (e.g. solid state, disk media, etc.), portable media (e.g. flash drive, DVD, CD, etc.), cloud storage (e.g. Amazon S3, etc.).

In general, the audio file generated by this process may be generated from the original video file, or it may be generated through any artificial means such as a file containing only white noise, a file provided independently from the video, or a file of complete silence.

Figure 6:
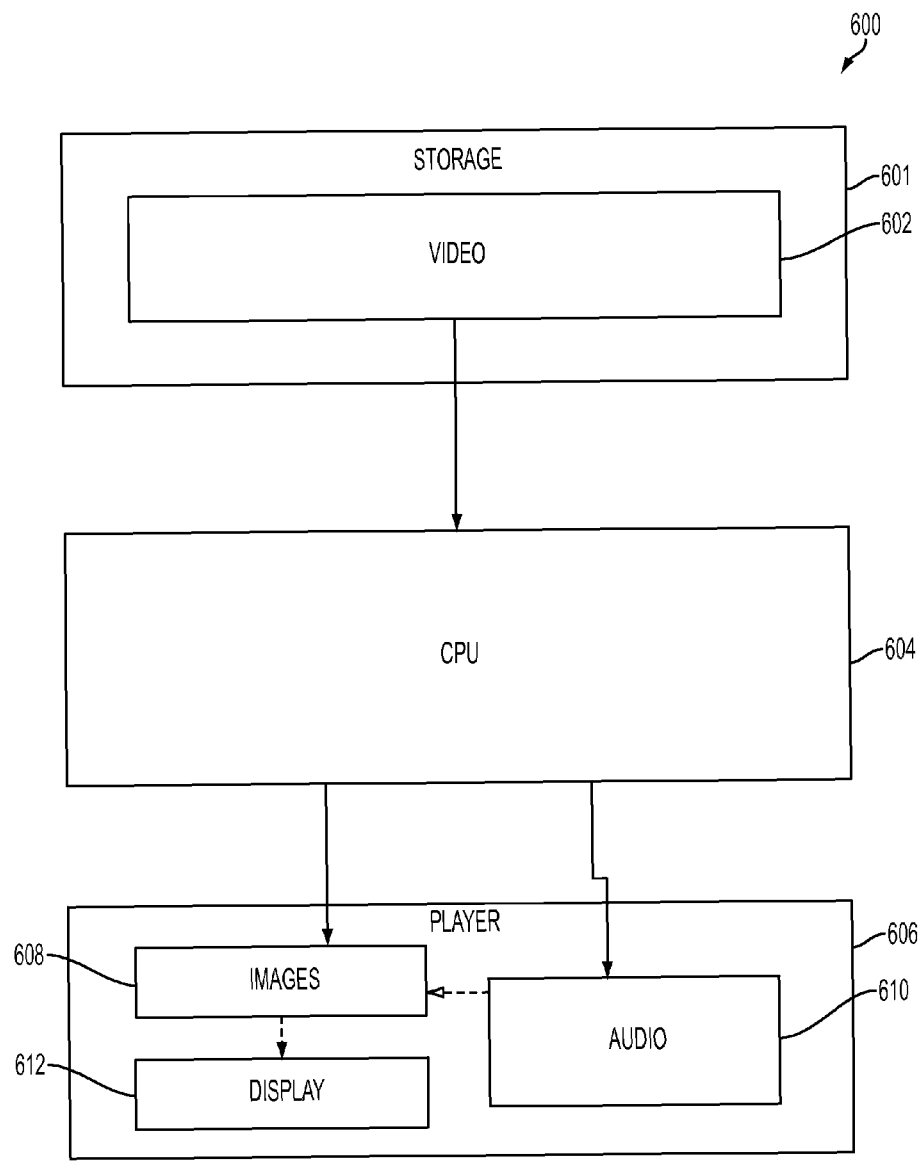
FIG. 6 illustrates a manner in which a video can be delivered to a player as individual components.

FIG. 6 illustrates a manner 600 in which a video may be delivered to a player as individual components, which the player may then piece together in order to deliver a video playback experience to viewers.

When a player (606) loads, the CPU (604) may load a video payload (602) from a storage medium (601). The CPU may then break this payload into individual image and audio data. Then, the player may deliver this data as separate payloads of images (608) and audio (610). The player may play the audio and simultaneously display the images in sequence at the same rate as the audio so as to maintain synchronization between the auditory and visual aspects of the content. The audio's progress timing may update and correct the image display's progress timing to reduce unacceptable differences in loading and or rendering and or processing between the audio and images so as to help ensure adequate synchronization is maintained.

Herein, unless otherwise defined, "video payload" is intended to include any form of digitally represented video, including but not limited to existing video codecs/playback formats (such as mpeg, h.264, ogg, webm, avi, etc.), separate audio and video files, or a collection of images with an audio file.

Herein, unless otherwise defined, "storage medium" is intended to include any form of storing digital data for later use, such as hard drives (e.g. solid state, disk media, etc.), portable media (e.g. flash drive, DVD, CD, etc.), cloud storage (e.g. Amazon S3, etc.).

Figure 7:
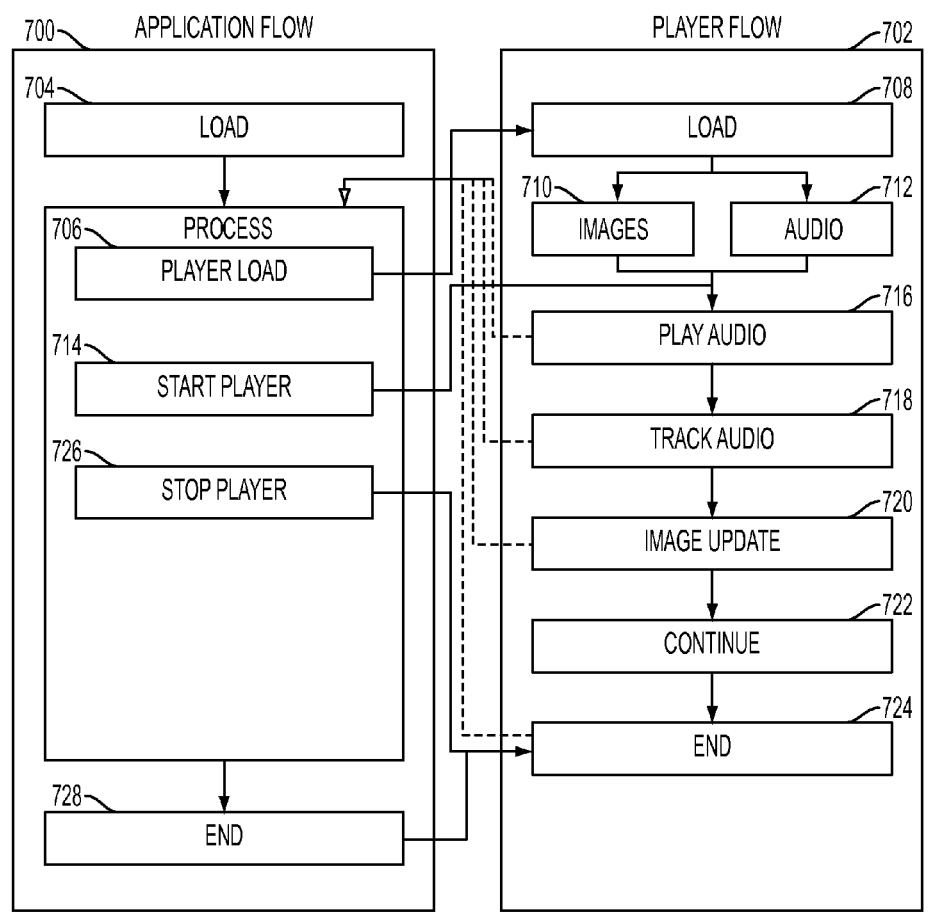
FIG. 7 describes the operational flow of a player that utilizes still images and a timing mechanism to deliver a video experience that is independent of a hosting application's flow.

FIG. 7 describes the operational flow of a player may utilize still images and a timing mechanism to deliver a video experience that is independent of a hosting application's flow.

The hosting application (700) may load (704) and begin its processing (706). Once the application begins, any of the interactions (706, 714) with the player (702) may happen at any time, and possibly multiple times.

As some part of the hosting application's process, it may load the player (708), and then continue, independent of the player's behavior.

When the player loads (708), it may load the images (710) and audio (712) that it may need for playback. Once these media are loaded, the player may wait for another signal from the hosting application to begin playback (714) whereupon it may begin playing the audio and displaying the images in sequence (716).

As the audio plays, the player may track the audio playback position (718). As the audio playback position changes, the player may ensure the currently displayed image matches of is properly correlated (720). If the image is chronologically behind the position of the audio, the current image may be replaced with the correct image. If the image is chronologically ahead of the position of the audio, the player may delay updating the image until the audio progress has caught up. The process of steps 718 and 720 may continue (722) until the playback ends through some signal (724) either directly from the user, or from the hosting application itself (726).

The player may also report events such as play starting (716), audio updates (718), image changes (720), and playback ending (724) back to the hosting application's process (706).

If the application ends (728), then playback may also end (724).

Herein, unless otherwise defined, "hosting application" is intended to include any mechanism for user interaction which could include video delivery, such as dedicated applications, web pages, or operating systems.

In one or more implementations, a method may include receiving a video file; forming an audio component file by extracting an audio portion of the video file; and forming a video component file by extracting a series of video frame still images from a video portion of the video file, wherein each video frame still image corresponds to a time wise point, or a time range (if several video frame still images are concatenated into one file), in the audio portion of the video file. In some cases, the method may also include storing the audio and video component files for later delivery. In various cases, the method may also include outputting the audio component file and outputting the video component file concurrently with the audio component file, wherein outputting the video component file includes displaying a particular video frame still image at the same rate of playback as the audio component while continually synchronizing the displayed image with the audio component's progress.

In various implementations, a method may include delivering an audio component file and a video component file for playback, wherein the video component file includes a series of images and each image corresponds to a time wise point, or a time range (if several video frame still images are concatenated into one file), in the audio component file; outputting the audio component file; and outputting the video component file concurrently with the audio component file, wherein outputting the video component file includes displaying images at the same rate of playback as the audio component while continually synchronizing the displayed image with the audio component's progress.

In some implementations, an electronic device may include a processor; a display surface connected to the processor; a non-transitory computer readable storage medium connected to the processor; an application stored on the storage medium and executable by the processor, wherein when the application executes on the processor, the application outputs to a first area of the display surface; and a video player stored on the storage medium and executable on the processor; wherein when the video player executes on the processor responsive to a call from the application, the video player outputs to a second area of the display surface, the second area being contained within the first area. In some cases, the video player is configured to receive video file; form an audio component file by extracting an audio portion of the video file; and form a video component file by extracting a series of video frame still images from a video portion of the video file, wherein each video frame still image corresponds to a time wise point, or a time range (if several video frame still images are concatenated into one file), in the audio portion of the video file. Further, the video player may be configured to output the audio component file; and output the video component file concurrently with the audio component file, wherein outputting the video component file includes displaying a particular video frame still image in the second area at a rate of playback equal to the audio component while continually synchronizing the displayed image with the audio components. Moreover, the application may be configured to provide output to the first area not including the second area while the video player provides output to the second area.

As described above, the present disclosure discloses systems, methods, and computer program products for converting video to video frame still image sequences. An electronic device may determine to present a video frame still image sequence version of a video instead of the video. The electronic device may derive a plurality of still images from the video utilizing the at least one processing unit. The electronic device may generate the video frame still image sequence by associating the plurality of still images. The electronic device may present the video frame still image sequence.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for converting video to video frame still image sequences, the method comprising:
    determining, utilizing at least one processing unit, to present a video frame still image sequence version of a video instead of the video;
    deriving a plurality of still images from the video utilizing the at least one processing unit;
    generating the video frame still image sequence by associating the plurality of still images together utilizing the at least one processing unit;
    deriving audio from the video;
    presenting the video frame still image sequence utilizing the at least one processing unit including playing at least a portion of the audio and displaying a portion of the still images of the video frame still image sequence according to timing information associated with the audio;
    determining that the displaying of the portion of the still images is ahead of the playing of the at least a portion of the audio; and
    pausing displaying at least one still image of the portion of still images to resynchronize the playing of the at least a portion of the audio and the displaying of the portion of the still images.

2. The method of claim 1, further comprising displaying at least one of the still images of the video frame still image sequence according to timing information to resemble play of the video.

3. The method of claim 1, wherein the timing information is based at least on a duration of the video.

4. The method of claim 1, wherein said determining that said displaying the portion of the still images is ahead of said playing the at least the portion of the audio is based at least on the timing information.

5. The method of claim 1, further comprising storing the video frame still image sequence.

6. The method of claim 1, wherein said operation of presenting the video frame still image sequence comprises transmitting video frame still image sequence in response to a request.

7. The method of claim 6, wherein each of the plurality of still images of the video frame still image sequence are transmitted in response to a respective request for the respective still image.

8. The method of claim 6, wherein at least one group of the plurality of still images of the video frame still image sequence are transmitted in response to a respective request for the at least one group.

9. The method of claim 1, wherein said operation of determining, utilizing at least one processing unit, to present a video frame still image sequence version of a video instead of the video comprises determining that an electronic device cannot play the video.

10. The method of claim 1, wherein said operation of determining, utilizing at least one processing unit, to present a video frame still image sequence version of a video instead of the video comprises determining that an electronic device cannot play the video on only a portion of a display of the particular electronic device.

11. The method of claim 1, wherein said operation of determining, utilizing at least one processing unit, to present a video frame still image sequence version of a video instead of the video comprises determining that an electronic device does not have sufficient resources to play the video.

12. The method of claim 1, wherein said operation of deriving a plurality of still images from the video utilizing the at least one processing unit further comprises:
    determining a number of still images that can be displayed to resemble play of the video; and
    deriving the number of still images from the video.

13. The method of claim 12, wherein said operation of determining a number of still images that can be displayed to resemble play of the video comprises determining the number based at least on a frame rate of the video.

14. A system for converting video to video frame still image sequences, comprising:
    at least one non-transitory storage medium storing instructions; and
    at least one processing unit;
    wherein the at least one processing unit executes the instructions to:
        determine to present a video frame still image sequence version of a video instead of the video;
        derive a plurality of still images from the video;
        generate the video frame still image sequence by associating the plurality of still images together;
        derive audio from the video;
        present the video frame still image sequence including playing at least a portion of the audio and displaying a portion of the still images of the video frame still image sequence according to timing information associated with the audio;
        determine that said displaying of the portion of the still images is ahead of or behind the playing of the at least a portion of the audio;
        pause displaying at least one still image of the portion of still images to resynchronize the playing of the at least a portion of the audio and the displaying of the portion of the still images in the event that the displaying of the portion of the still images is ahead; and skip at least one still image of the portion of still images to resynchronize the playing of the at least a portion of the audio and the displaying of the portion of the still images in the event that the displaying of the portion of the still images is behind.

15. A computer program product comprising:

a first set of instructions, stored in at least one non-transitory machine readable medium, executable by at least one processing unit to determine to present a video frame still image sequence version of a video instead of the video;

a second set of instructions, stored in the at least one non-transitory machine readable medium, executable by the at least one processing unit to derive a plurality of still images from the video;

a third set of instructions, stored in the at least one non-transitory machine readable medium, executable by the at least one processing unit to generate the video frame still image sequence by associating the plurality of still images together;

a fourth set of instructions, stored in the at least one non-transitory machine readable medium, executable by the at least one processing unit to derive audio from the video;

a fifth set of instructions, stored in the at least one non-transitory machine readable medium, executable by the at least one processing unit to generate video frame still image sequence output for presentation on a display device, the output causing the display device to play at least a portion of the audio and display a portion of the still images of the video frame still image sequence according to timing information associated with the audio;

a sixth set of instructions, stored in the at least one non-transitory machine readable medium, executable by the at least one processing unit to determine that the displaying of the portion of the still images is ahead of the playing of the at least a portion of the audio; and a seventh set of instructions, stored in the at least one non-transitory machine readable medium, executable by the at least one processing unit to generate output that causes the display device to pause displaying at least one still image of the portion of still images to resynchronize the playing of the at least the portion of the audio and the displaying of the portion of the still images.

16. The computer program product of claim 15, further comprising an eighth set of instructions, stored in the at least one non-transitory machine readable medium, executable by the at least one processing unit to determine that the displaying of the portion of the still images is behind the playing of the at least a portion of the audio; and a ninth set of instructions, stored in the at least one non-transitory machine readable medium, executable by the at least one processing unit to skip at least one still image of the portion of still images to resynchronize the playing of the at least a portion of the audio and the displaying of the portion of the still images.

17. The computer program product of claim 15, wherein the video frame still image sequence output cause the display device to display at least one of the still images of the video frame still image sequence according to timing information to resemble play of the video.

18. The computer program product of claim 15, wherein the video frame still image sequence output is generated in response to a request.

19. The computer program product of claim 15, wherein the sixth set of instructions that are executable to determine to present a video frame still image sequence version of a video instead of the video further includes instructions stored in the at least one non-transitory machine readable medium, executable by the at least one processing unit to determine that an electronic device cannot play the video.

20. The computer program product of claim 15, wherein the sixth set of instructions that are executable to determine to present a video frame still image sequence version of a video instead of the video further includes instructions stored in the at least one non-transitory machine readable medium, executable by the at least one processing unit to determine that an electronic device cannot play the video on only a portion of a display of the particular electronic device.

21. The computer program product of claim 15, wherein the sixth set of instructions that are executable to determine to present a video frame still image sequence version of a video instead of the video further includes instructions stored in the at least one non-transitory machine readable medium, executable by the at least one processing unit to determine that an electronic device does not have sufficient resources to play the video.

22. A method for converting video to video frame still image sequences, the method comprising:

determining, utilizing at least one processing unit, to present a video frame still image sequence version of a video instead of the video;

deriving a plurality of still images from the video utilizing the at least one processing unit;

generating the video frame still image sequence by associating the plurality of still images together utilizing the at least one processing unit;

deriving audio from the video;

presenting the video frame still image sequence utilizing the at least one processing unit including playing at least a portion of the audio and displaying a portion of the still images of the video frame still image sequence according to timing information associated with the audio;

determining that said displaying the portion of the still images is behind said playing the at least a portion of the audio; and skipping at least one still image of the portion of still images to resynchronize said playing the at least a portion of the audio and said displaying the portion of the still images.

23. The method of claim 22, further comprising displaying at least one of the still images of the video frame still image sequence according to timing information to resemble play of the video.

24. The method of claim 22, wherein said determining that said displaying the portion of the still images is ahead of said playing the at least a portion of the audio is based at least on the timing information.

* * * * *